United States Patent [19]

Spongr et al.

[11] 4,434,366

[45] Feb. 28, 1984

[54] APPARATUS FOR MEASURING COATING THICKNESS

[75] Inventors: Jerry J. Spongr, Tonawanda; John E. Tiebor, Williamsville; Boris N. Ivasyuk, Tonawanda, all of N.Y.

[73] Assignee: Twin City International, Inc., Amherst, N.Y.

[21] Appl. No.: 406,358

[22] Filed: Aug. 9, 1982

[51] Int. Cl.³ .............................................. G01N 23/00
[52] U.S. Cl. .................................. 250/308; 73/150 R
[58] Field of Search ...................... 73/1 J, 150 R, 159; 250/308

[56] References Cited

U.S. PATENT DOCUMENTS 3,499,152  3/1970  Hetenhouser ...................... 250/308
4,190,770  2/1980  Saunders et al. .................. 250/308

Primary Examiner—Jerry W. Myracle
Assistant Examiner—Hezron Williams
Attorney, Agent, or Firm—Allen J. Jaffe

[57] ABSTRACT

A coating thickness measuring apparatus for step and repeat coating systems, including; a support member; a common support assembly mounted for pivotal movement about and along a vertical axis; a measuring probe carried by the common support assembly and movable with respect thereto along a horizontal axis; a calibrating disc carried by the common support assembly for rotation with respect thereto about a horizontal axis, having an opening for reception therethrough of the probe and having a plurality of angularly spaced calibration standards movable into selective alignment with the probe; actuators for moving the probe along its horizontal axis, for vertically moving the common support assembly and for rotating the calibration disc; stroke limiting means to halt probe movement between its extreme positions; an indexing bar having a plurality of variably spaced openings; an indexing pin for securing the support member into one of the indexing bar openings; and sensing switches developing signals indicative of the positions of various moving components of the apparatus.

22 Claims, 7 Drawing Figures

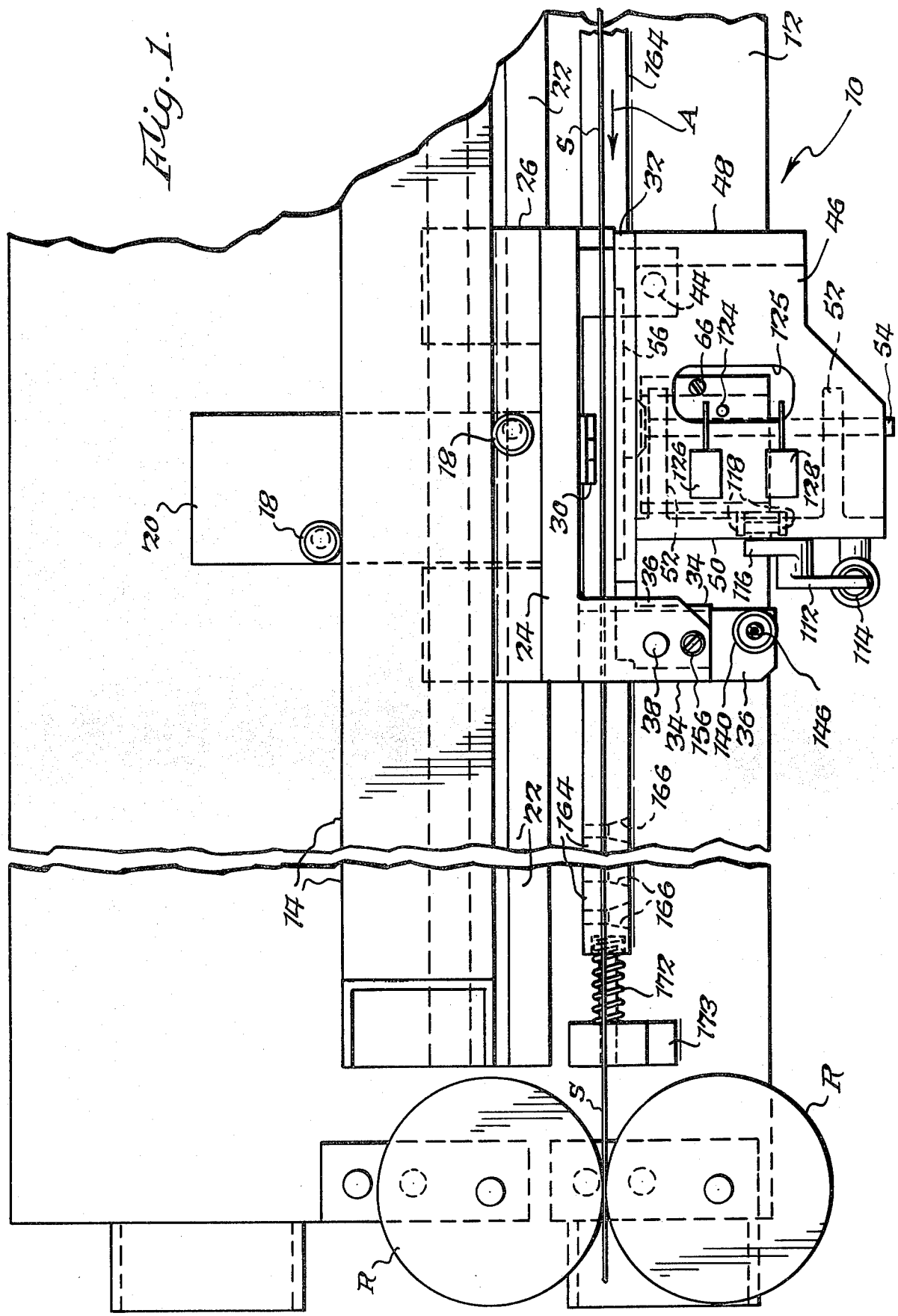

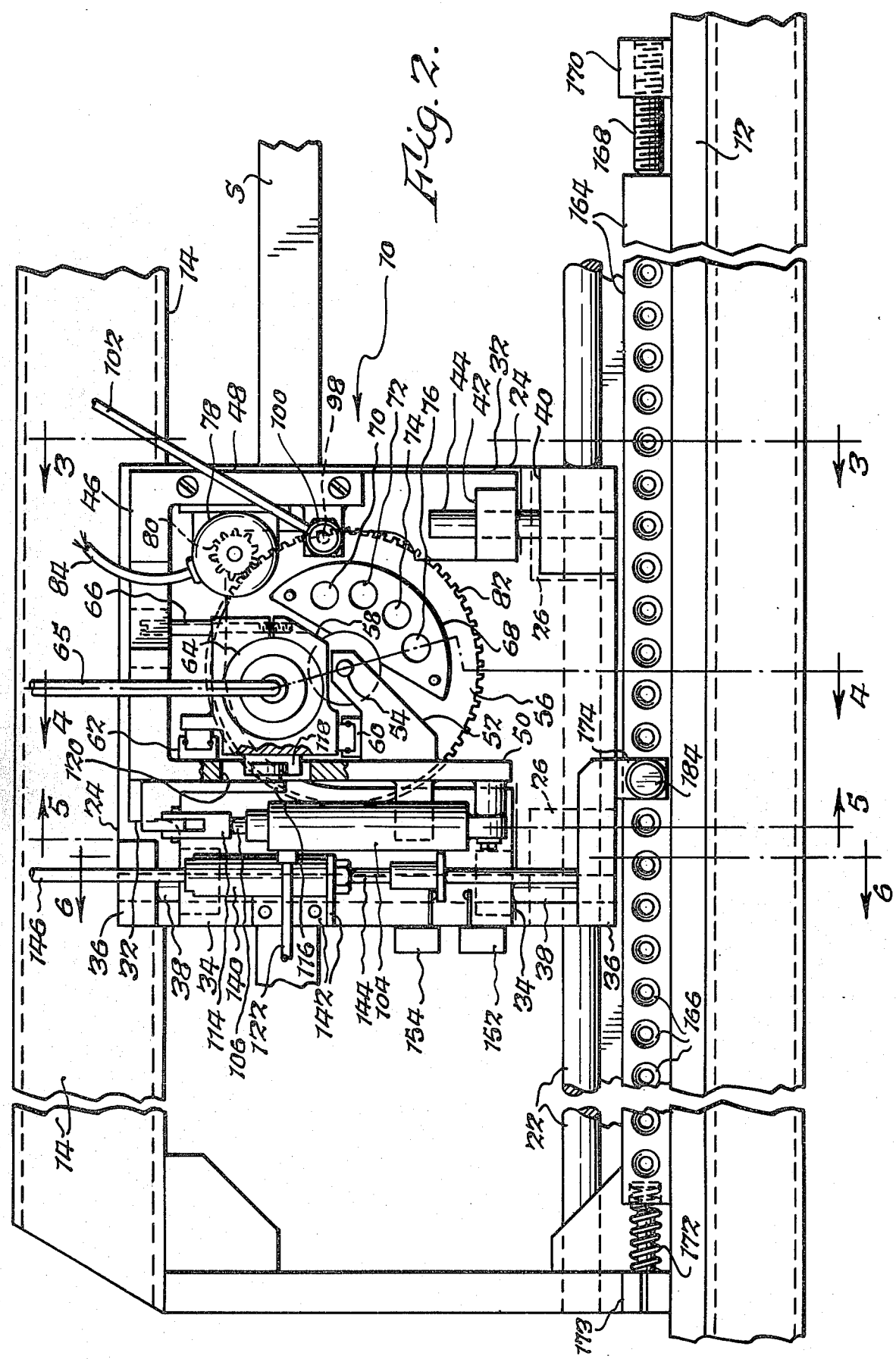

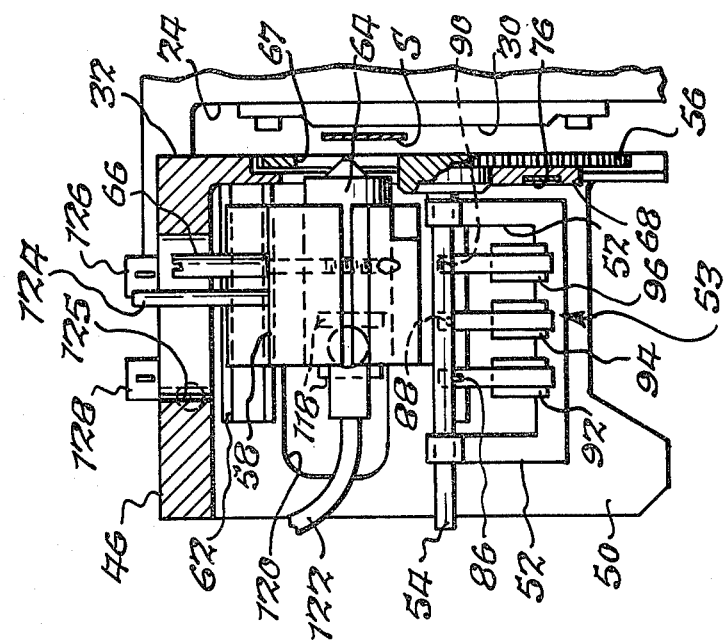

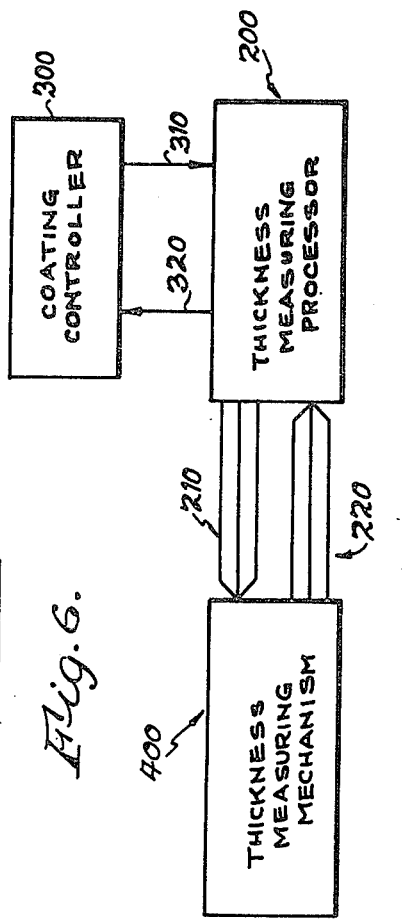
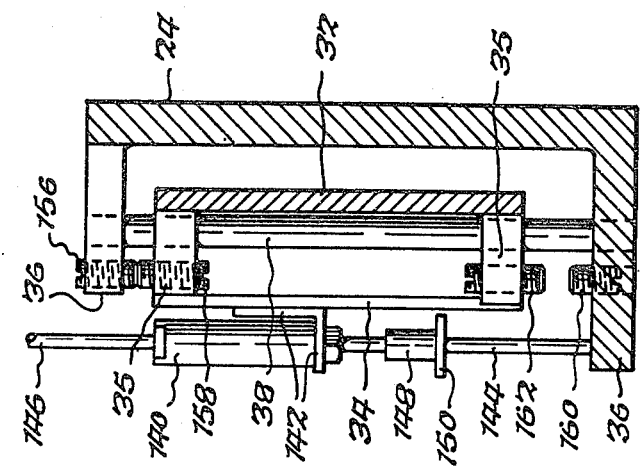
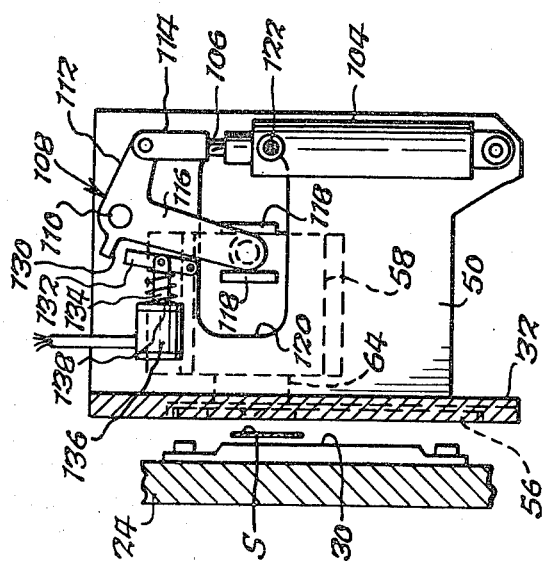

APPARATUS FOR MEASURING COATING THICKNESS

SUMMARY OF THE INVENTION

The present invention relates to coating thickness measuring systems and, more particularly, to an automated system for measuring coating thickness on predetermined and selected spots or areas of a strip-type material during the dwell period of a step and repeat coating system, which areas may be horizontally and/or vertically spaced.

Typically, in a step and repeat coating system, a continuous strip of material is cyclically coated with suitable coatings such as gold, silver or the like at one or more preselected areas thereof by well known coating techniques.

In operation the strip is stopped for a time interval or dwell period long enough for the application of coating thereto and is then cyclically moved or longitudinally indexed to the next region or regions for subsequent coating applications.

In accordance with the present invention a measuring apparatus is provided that operates in conjunction with the coating system whereby measurements of coating thicknesses are made on a strip-type substrate during the dwell periods of the coating system and after the coating material has been applied to a downstream portion of the substrate and during the application of coating to an upstream portion thereof. In as much as each dwell period may not be long enough to enable an accurate thickness measurement of a single coated spot or area, a plurality of successive partial measurements may be made during a number of such dwell periods at equally spaced and precisely located spots along the coated strip of material. The partial measurements may then be suitably integrated to develop a statistically acceptable representation of the coating thickness, as is well known.

Moreover, it may be desirable to measure the coating thickness on the strips at areas or spots that are at various vertically spaced or transverse locations along the longitudinal axis of the strip. It is, accordingly, an object of the present invention to provide a measuring apparatus wherein the sensing probe is automatically actuable to make successive measurements along the coated strip at a plurality of transversely spaced spots or areas thereon.

One form of measuring probe that may be advantageously employed in coaction with the apparatus of the present invention may be one using the well known beta radiation backscatter principle. It is to be understood, however, that probes using other measuring principles may be similarly utilized.

Essentially, then, the present invention provides an apparatus for measuring coating thicknesses on selected, predetermined areas of a strip-type material during the dwell period of a step and repeat coatig system, comprising; a thickness measuring probe supported for movement along at least a translational axis to a measuring position with respect to the strip-type material during the dwell period of the coating system and movable away therfrom to a second position during the motion period of the coating system; means responsive to a dwell period signal for moving the probe to its measuring position; and the probe is normally constrained against movement parallel to the axis of movement of the strip-type material during the intervals of motion thereof.

It is a further feature of the present invention to provide suitable stroke limiting means which functions between successive dwell period measurements to substantially shorten the normal stroke of the probe and thereby reduce the travel time thereof towards and away from the coated strip-type material. In this manner, more dwell period time is spent on measurements and not wasted on probe movement.

Further, in accordance with the teachings of the present invention means are provided to support suitable calibration standards, which means are conveniently and efficiently located adjacent to the probe and the coated strip whereby, upon actuation of a suitable drive, preselected standards can be quickly and automatically aligned with the probe for initial calibration and periodic verification thereof.

It is a still further feature of the present invention to provide suitable indexing means which coact with the probe support assembly to permit the measuring probe to be quickly, easily and accurately positioned with respect to the spacing of strip spots or areas to be measured.

Other characterizing features and advantages of the present invention will become readily apparent from the ensuing detailed description thereof.

BRIEF DESCRIPTION OF THE DRAWINGS

For a fuller understanding of the present invention reference should now be made to the following detailed description thereof taken in conjunction with the accompanying drawings, wherein:

FIG. 1 is a top plan view of the apparatus of the invention;

FIG. 2 is a front elevational view of the apparatus of FIG. 1;

FIG. 3 is a fragmentary view, partially in section, taken substantially along line 3—3 of FIG. 2;

FIG. 4 is a fragmentary view, partially in section, taken substantially along line 4—4 of FIG. 2;

FIG. 5 is a fragmentary view, partially in section, taken substantially along line 5—5 of FIG. 2;

FIG. 6 is a fragmentary view, partially in section, taken substantially along line 6—6 of FIG. 2; and FIG. 7 is a schematic functional block diagram generally indicating the functional interrelationship between the thickness measuring system of the present invention, the electronic processor therefor and the coating system controller.

DETAILED DESCRIPTION OF THE PREFERRED EMBODIMENT

Referring to the drawings and, more particularly, to FIGS. 1, 2 and 3 the coated strip material S is shown as guided by rollers R as the same emanates from a coating system (not shown) and passes through, in the direction of arrow A, the thickness measuring apparatus, which is generally depicted at 10. The measuring apparatus includes a substantially horizontally disposed base 12 which is adjustably fixed to a square cross-sectioned, longitudinally extending frame member 14 by means of an upstanding connecting member 16. Suitable eccentric rollers 18 affixed to a plate 20 may be provided for engagement with opposite side faces of member 14 to compensate for variations in the distance between such side faces. The measuring assembly is mounted on base 12 for adjustable movement with respect to a horizontally disposed cylindrical guide rail 22, upstanding from base 12. To this end, a vertically disposed support member 24 is provided on the lower face thereof with a rearwardly projecting member 26 having a through-bore 28 in sliding engagement with guide rail 22. It is to be understood that, during normal operation of the measuring assembly, the support member 24 is suitably held stationary with respect to guide rail 22 such that no relative motion is permitted therebetween. Suitably secured to the front face of member 24 is a plate 30 which is located adjacent to the coated strip-type material S and may serve as a back support therefor during measurement, as will become apparent hereinbelow.

The measuring probe and other operative components of the present invention may be secured on a common support assembly which, in turn, may be pivotally mounted with respect to support member 24 whereby the former may be swung open for easy access to such components. To this end, the common support assembly includes a plate 32, which is normally spaced from member 24 (such that strip S is located between member 24 and plate 32), and which is in substantially coplanar relation with both strip S and member 24; a forwardly extending block 34 adjacent to and secured to one side edge of plate 32; and upper and lower apertured ledges 35 (FIG. 6) forwardly projecting from plate 32 which are aligned with corresponding upper and lower apertured ledges 36 of support member 24. A hinge shaft 38 or the like passes through the apertures of ledges 35 and 36 whereby plate 32 and the components carried thereby may be pivotally moved with respect to support member 24 about the axis of shaft 38 and along the axis thereof for vertical positioning, as will become apparent hereinbelow.

Means are provided to lock plate 32 into its operative, closed position and may include a bored ledge 40 extending forwardly from the opposite side edge of support member 24, in substantial horizontal alignment with lower ledge 36; a bushing 42 fixed to plate 32 in alignment with ledge 40; and a pin 44 received within the bushing and the bore of ledge 40. Thus, with pin 44 in place, plate 32 is prevented from pivotal movement about shaft 38 but can move vertically with respect thereto and with respect to pin 44.

Further included as a part of the common support assembly is a probe carrying frame or open housing structure, secured to plate 32, having a forwardly projecting top wall section 46 and a pair of forwardly projecting sidewall sections 48 and 50, respectively. A pair of arms 52 (FIGS. 1 and 2), on a block 53, extend from section 50 and are provided at their upper ends with openings for rotatably supporting the shaft 54 of a calibration disc 56, which is located in an opening through plate 32 so as to be substantially coplanar therewith. A probe carrying clamping block 58 is supported on arms 52 for translational movement along an axis substantially perpendicular to the plane of the coated strip-type material S by means of a linear bearing assembly 60 and is supported on an upper portion of sidewall 50 by a linear bearing assembly 62, which is oriented substantially 90 degrees from bearing assembly 60. Clamping block 58 is of split construction defining a substantially cylindrical interior for the reception of a measuring probe 64 which is secured thereto by a clamping bolt 66. Probe actuation signals and measurement data may be transmitted via electrical line 65 extending from one end of probe 64. An opening 67 (FIG. 4) is provided in disc 56 to permit the probe to pass therethrough during its translational movement. Calibration disc 56 may be provided with an arcuate segment 68 secured to the front face thereof and carrying a plurality of disc-type, angularly spaced calibration standards 70, 72, 74 and 76.

As best seen in FIG. 3, suitable drive means for imparting rotation to disc 56 about the axis of shaft 54 may include a stepper motor 78 secured to sidewall 48 and having an output drive gear 80 for coaction with gear teeth 82 on the periphery of disc 56. Motor 78 is responsive to signals from electrical leads 84, as will become apparent hereinbelow. Shaft 54 of disc 56 may be provided with a plurality of laterally projecting actuating pins 86, 88 and 90 (FIG. 4) which are located in spaced relation along the axis of shaft 54 and angularly spaced or staggered thereabout. A like plurality of position sensing means in the form of micro-switches 92, 94 and 96 are secured to block 53 in alignment with their respective actuating pins 86, 88 and 90. It should thus be apparent that the signals or pulses from any one micro-switch or from any combination thereof will provide signals indicative of the angular position of disc 56 and the standards carried thereby, as well as that of disc opening 67.

Disc 56 may be locked in any one of its angular positions by means of a suitable braking device in the form of a piston rod 98 (FIG. 2) movably extending from a pneumatic cylinder or the like 100, in perpendicular relation to the front surface of disc 56 for abutting engagement therewith. Cylinder 100 is suitably supported by sidewall 48, is fed from line 102 and is of the type wherein a spring (not illustrated) normally biases the rod 98 into engagement with disc 56 and wherein fluid pressure in line 102 moves the same out of engagement therewith to permit stepper motor 78 to rotate the disc.

As best seen in FIGS. 2 and 5, means are provided to cause horizontal translation of probe 64 to its measuring position which, in the case of a probe of the beta radiation backscatter type, could be in contact with the coated strip-type material S. Such means may comprise a substantially vertically disposed pneumatic cylinder 104 suitably supported by sidewall 50; a piston rod 106 normally spring biased to maintain probe 64 in spaced, nonoperative relation to coated strip S; and a bell crank linkage 108 mounted on sidewall 50 for pivotal movement about a horizontal axis 110. Linkage 108 has one arm 112 pivotally connected to the spaced ears 114 of an actuating element fixed to the end of rod 106 and its other arm 116 in operative engagement between a pair of lugs 118 which are affixed to clamp block 58 for movement therewith. The arrangement is such that vertical movement of rod 106 causes horizontal or translational movement of clamp block 58 together with the measuring probe 64 secured thereto. Fluid may be supplied to the upper end of cylinder 104 by a pneumatic line 122. An actuating pin 124 (FIGS. 3 and 4) is suitably affixed to clamp block 58 and extends vertically therefrom through an opening 125 in top wall 46 in horizontal alignment with the leafs of a pair of micro-switches 126 and 128 which function as sensing means to develop signals that are respectively indicative of the measuring position of probe 64 closest to coated strip S and the home position thereof maximally spaced therefrom.

Means are provided to limit the stroke of probe 64 to a position intermediate its measuring position and its maximally spaced position away from coated strip S whereby the distance traveled by the probe between successive measuring cycles may be significantly reduced to, thus, permit maximum utilization of each dwell period. To this end, bell crank 108 (FIG. 5) is provided with a projecting tab 130 adjacent to axis 110 for normal operative engagement with a pivotally mounted lever 132 which is connected to the armature 134 of a solenoid 136. Lever 132 is normally biased by a spring 138 into a position to intercept tab 130 to limit or stop the travel of probe 64 and actuable to a position out of the path of tab 130, upon energization of solenoid 136, to thereby permit probe 64 to move to its home position of maximum spacing from coated strip S. This maximally spaced or home position of probe 64 is located beyond opening 67 in calibrating disc 56 (FIG. 4) such that the disc may be rotated, if desired, without interfering with the probe, as will become apparent hereinbelow.

For aligning the measuring probe 64 with vertically spaced coated spots or areas of the strip S, means are provided to move the same vertically or transverse of the probe's translational axis. As best seen in FIGS. 2 and 6, such means includes a pneumatic cylinder 140 affixed to block 34 by an L-shaped bracket 142 and a stationary piston rod 144 extending downwardly from cylinder 140 in abutting engagement with lower ledge 36 of member 24. Cylinder 140 may be spring biased to its lowermost position and is actuable by fluid from line 146 to cause upward movement thereof. In as much as the cylinder 140 is fixed to block 34, which also carries probe 64, movement thereof will cause corresponding movement of the measuring probe. A collar 148 is fixed to piston rod 144 and is provided with an enlarged diameter lower flange 150 aligned with vertically spaced position sensing micro-switches 152 and 154, which are movable with block 34. Switches 152 and 154, thus, develop signals which are respectively indicative of the uppermost position and lowermost position of measuring probe 64. Coacting and adjustable upper limit stops 156, 158 are provided in upper ledge 36 and ledge 35, respectively, to limit upward movement of the probe; whereas similar limit stops 160, 162 are provided in lower ledge 36 and ledge 35, respectively, to limit downward movement of the probe.

To permit accurate, precise and repeatable positioning of the measuring probe 64 with respect to the preselected horizontally spaced areas on strip S for thickness measurement, suitable indexing means are provided in accordance with the present invention. As best seen in FIGS. 1, 2, and 3 such indexing means includes an elongated longitudinally extending indexing bar 164 having a plurality of variably spaced transverse tapered openings 166. Bar 164 is slidably mounted on base 12 adjacent and below support member 24, substantially parallel with respect to guide rail 22 and is adjustably movable with respect to base 12. For this purpose, an adjusting bolt 168 passes through an internally threaded member 170, fixed to base 12, for engagement with one end of bar 164; the other end of which being suitably biased towards bolt 168 by a spring 172 interposed between such other end and a spring retaining member 173. Thus, the horizontal position of bar 164 may be altered by rotation of bolt 168 which, in turn, causes translation of the bar against the bias of spring 172. The spacing between each of the bar openings 166 is correlated to the variable spacing pattern of coated areas or spots on strip S. The measuring apparatus 10 may, accordingly, be moved and locked into a preselected opening 166 each time it is desired to measure repeated spots on strip S that are at different horizontal locations or spacings than that of previously measured repeated spots thereon. In this manner, as will become apparent hereinbelow, it is only necessary to align probe 64 once for each strip S regardless of the variability in horizontal spacing of the coated areas thereon. To lock assembly 10 in a preselected bar opening 166, a removable indexing assembly is secured to the bottom face of ledge 36 and includes a housing 174; a pin 176, slidable within the housing, having a tapered forward end 178 engageable within bar opening 166; a spring 180 between the pin and the housing for biasing the pin into such engagement; and a shaft 182 extending from the rear end of pin 176 through housing 174 and terminating in an exterior adjusting knob 184. Movement of knob 184, against the bias of spring 180, will permit disengagement of pin end 178 with bar opening 166 whereby the entire measuring assembly 10 may be horizontally indexed along guide rail 22 for securement with respect to another bar opening 166. Shaft 182 may be provided with a lateral projection 186 to engage the leaf of a microswitch 188 to provide a signal indicative of engagement or disengagement of the indexing assembly with respect to any of the bar openings 166. Switch 188 may be fixedly supported with respect to housing 174. It should be understood that automatic indexing means may be alternatively employed.

OPERATION

Prior to routine operation of the above-described apparatus, the measuring probe 64 may be removed and replaced with a suitable optical aligning device, such as a microscope, whereby the support member 24 and the common assembly carried thereby is adjusted for precise alignment with one set of coated repeat spots or areas on strip S by means of indexing bar 164. Once alignment is complete, the indexing pin 176 is operatively engaged with one of the bar openings 166 corresponding to a particular set of spaced spots to be measured on strip S. The probe 64 is then replaced and the measurement process may commence under electronic control of the thickness measuring processor 200, schematically depicted in FIG. 7.

The coating controller 300 sends a signal via line 310 to processor 200 indicating initiation of the dwell period for the application of coating to strip S. In response to this signal the processor 200 transmits appropriate signals via data lines 210 to cause actuation of the thickness measuring structure of the present invention, schematically depicted at 400. Fluid is supplied to probe cylinder 104 causing inward movement thereof to its measuring position in contact with strip S against backing plate 30 and causing actuation of micro-switch 126 which, in turn, sends a signal back to processor 200 via data line 220 for initiation of the measuring or partial measuring cycle. To limit the stroke of probe 64 between successive measuring cycles it should be noted that spring 134 normally biases lever 132 to intercept tab 130 of bell crank 108. However, when it is desired to move probe to its maximally spaced or home position (as when disc 56 is to be rotated for calibration purposes) an appropriate signal is sent from processor 200 to energize solenoid 136 to retract lever 132 out of the path of movement of tab 130. Forward movement of probe 64 is then permitted and when micro-switch 128 is actuated a signal is fed back to processor 200 via line 210 whereby a signal can be sent therefrom via line 210 to actuate stepper motor 78.

The duration of each dwell or measuring period is determined by the dwell time of strip S; therefore, coating controller 300 sends an appropriate signal to processor 200 signifying the end of the coating process and processor 200, in turn, actuates closing of a solenoid valve (not illustrated). The solenoid valve cuts the supply of fluid to probe cylinder 104 whereby the probe is retracted to its intermediate position, under the influence of the cylinder spring, in readiness for the next dwell or measuring period signal. A feedback signal may be provided via line 320 to signal the end of the measuring cycle and cause coating controller 300 to permit indexing motion of strip S for the next successive coating application thereto. In addition, signals can be transmitted via line 320 to vary (if necessary) the coating current to alter coating thickness if the measured coating deviates from preselected values. When it is desired to take measurements on a different spot of a set of horizontally repeating spots on strip S, the assembly 10 may be suitably indexed to an opening 166 on bar 164 which corresponds to the horizontal deviation from the previous spot, without any need for probe removal for realignment purposes. It is to be understood that bar 164 will be replaced with one having different spaced openings when a new strip S, having different repeat spot spacing patterns, is employed.

Vertical adjustments of probe 64 for the measurement of vertically displaced repeating spots on strip S is accomplished by a signal from processor 200 to a solenoid valve (not illustrated) for supplying fluid to cylinder 140 to cause the cylinder and the probe carrying common block assembly to slide upwardly along shaft 38 and pin 44 to the position shown in FIG. 6, with actuation of micro-switch 152 (FIG. 2) signaling, via line 220, completion of upward travel. Similarly, for downward travel, fluid pressure to cylinder 140 is cut-off whereby the spring therein acting against piston rod 144 causes the same to lower; with actuation of micro-switch 154 signaling the completion of downward travel. Although only two positions of vertical adjustment for probe 64 have been illustrated, it should be understood that any number of additional positions could be provided for, with but minor structural modifications as would be known to those skilled in the art.

For initial calibration and for periodic calibration verifications, signals from processor 200 actuate solenoid 136 permitting probe 64 to move to its home position (maximally spaced position) clear of disc opening 67; and also actuating stepper motor (in response to probe micro-switch 128) to cause rotation of disc 56 to place selected standards 70, 72, 74 and 76 in alignment with probe 64 whereby the probe may then be actuated to move into contact therewith. In the case of a beta backscattering probe, these standards may correspond to (or have atomic numbers corresponding to) the substrate material of strip S, the coating material thereon and the combined substrate and coating thickness, as is well known. The signals from micro-switches 92, 94 and 96 will at any time indicate to the processor 200, via line 210, the particular standard in alignment with the probe as well as the angular position of the calibrating disc 56, such that the data received by the processor will be interpreted correctly.

Although a preferred embodiment of the present invention has been disclosed and described, changes will obviously occur to those skilled in the art without departing from the spirit thereof. For example, although pneumatic control of various measuring assembly functions has been disclosed, it is clear that electrical devices or the like could be employed in lieu thereof. Further, although one measuring probe system has been disclosed, it is obvious that additional probes may be employed for simultaneously or sequentially measuring the coating thickness at different spots along the strip (as in the case where the coatings are of different materials). It should be also understood that although the strip has been illustrated in a vertical plane and the probe axis has been illustrated as horizontal, it would be obvious, if desired, to reorient this structure such that the strip would be contained within a horizontal plane and the probe axis would be vertical. It is, therefore, intended that the present invention is to be limited only by the scope of the appended claims.

What is claimed is:

1. Apparatus for measuring coating thicknesses on selected areas of a strip-type material of a step and repeat coating system having a dwell period and a motion period the apparatus comprising:
   a thickness measuring probe supported for movement at least along a translational axis to a measuring position with respect to the strip-type material during the dwell period of the coating system and movable away therefrom to a second position during the motion period of the coating system;
   means responsive to a dwell period signal for moving said probe to said measuring position; and
   said probe is normally contrained against movement parallel to the axis of movement of the strip-type material.

2. The apparatus according to claim 1, further comprising:
   means for moving said probe substantially perpendicular to said translational axis whereby selected coated areas of the strip-type material may be measured on transversely spaced portions thereof during the dwell period of the coating system.

3. The apparatus according to claim 1, wherein:
   said second position is maximally spaced from the strip-type material; and there is further provided
   means for moving said probe to said second position; and
   stroke limiting means for halting movement of said probe towards said second position whereby translational motion of said probe is stopped at a third position intermediate said measuring and said second positions to thereby substantially reduce the stroke of probe movement between successive measuring cycles of said coating system.

4. The apparatus according to claim 1, further comprising:
   calibrating means located between said probe and the strip-type material when said probe is in said second position, said calibrating means carrying a plurality of spaced calibration standards; and
   means for moving said calibrating means to place selected standards in alignment with said probe.

5. The apparatus according to claim 4, wherein:
   said calibrating means is mounted for rotation about an axis parallel to said translational axis; and
   said calibration standards are angularly spaced on said calibrating means.

6. The apparatus according to claim 5, further comprising:
   sensing means for generating signals that are responsive to and indicative of the angular position of said calibrating means and said standards.

7. The apparatus according to claim 6, wherein:
said calibrating means includes a shaft affixed thereto and is supported for rotation about an axis parallel to said translational axis; and
said sensing means comprises a plurality of angularly spaced actuators projecting peripherally from said shaft and a like plurality of stationary microswitches for actuation thereby.

8. The apparatus according to claim 7, further comprising:
means adjacent said calibrating means and actuable for preventing rotation thereof.

9. The apparatus according to claim 7, wherein:
said calibrating means includes an opening for reception of said probe when said probe is in said measuring position.

10. The apparatus according to claim 7, wherein:
said probe and said calibrating means are mounted on a common support assembly; and
said common support assembly is hingedly mounted for pivotal movement about an axis that is substantially perpendicular to said translational axis whereby said common support assembly may be swung away from the strip-type material.

11. The apparatus according to claim 1, further comprising:
means for moving said probe substantially perpendicular to said translational axis whereby selected coated areas of the strip-type material may be measured on transversely spaced portions thereof during the dwell period of the coating system; and
said second position is maximally spaced from the strip-type material; and there is further provided
means for moving said probe to said second position; and
stroke limiting means for halting movement of said probe towards said second position whereby translational motion of said probe is stopped at a third position intermediate said measuring and said second positions to thereby substantially reduce the stroke of probe movement between successive measuring cycles of said coating system.

12. The apparatus according to claim 11, further comprising:
calibrating means mounted for rotation about an axis parallel to said translational axis and located between said probe and the strip-type material when said probe is in said second position, said calibrating means including a plurality of angularly spaced calibration standards; and
means for rotating said calibrating means to place selected standards in alignment with said probe.

13. The apparatus according to claim 12, wherein:
said calibrating means includes a shaft affixed thereto and is supported for rotation about said last-mentioned axis; and
said sensing means comprises a plurality of angularly spaced actuators projecting peripherally from said shaft and a like plurality of stationary micro-switches for actuation thereby.

14. The apparatus according to claim 13, wherein:
said probe and said calibrating means are mounted on a common support assembly; and
said common support assembly is hingedly mounted for pivotal movement about an axis that is substantially perpendicular to said translational axis whereby said common support assembly may be swung away from the strip-type material.

15. The apparatus according to claim 11, wherein:
said means responsive to a dwell period signal and said means for moving said probe comprises fluid operated devices mechanically connected to said probe; and
said stroke limiting means includes a solenoid operated lever actuable to halt movement of one of said fluid operated devices.

16. The apparatus according to claim 15, wherein:
said one fluid operated device includes a cylinder having a piston rod operatively connected to said probe;
abutment means are provided for movement with said piston rod; and
said lever is actuable to engage said abutment means to limit the stroke of said piston rod.

17. The apparatus according to claim 11, further comprising:
indexing means for adjustably moving said probe along an axis substantially parallel to the axis of movement of the strip-type material and securing said probe in one of a plurality of positions, the spacing between which corresponds to the spacing between variably spaced coated areas on the strip-type material.

18. The apparatus according to claim 17, wherein:
said probe is of the beta radiation backscattering type.

19. The apparatus according to claim 1, further comprising:
indexing means for adjustably moving said probe along an axis substantially parallel to the axis of movement of the strip-type material and securing said probe in one of a plurality of positions, the spacing between which corresponds to the spacing between variably spaced coated areas on the strip-type material.

20. Apparatus of the character described, comprising:
a support member;
a common support assembly mounted to said support member for pivotal movement with respect thereto about a first axis and movable along said axis;
a probe carrying member mounted on said common support assembly for translational movement along a second axis that is substantially perpendicular to said first axis and movable with said common support assembly along said first axis;
a calibration disc supported by said common support assembly for rotation about said second axis and carrying a plurality of angularly spaced claibrating standards; and
stroke limiting means actuable to limit translational movement of said probe carrying member between its extreme positions.

21. The apparatus according to claim 20, wherein:
said support member is adjustably mounted for movement along a longitudinal axis; and there is further provided
indexing means for securing said support member in a predetermined one of a plurality of variably spaced positions along said longitudinal axis.

22. The apparatus according to claim 21, wherein:
said indexing means includes an indexing bar having a plurality of variably spaced openings therealong and an indexing pin selectively positionable in said openings.

* * * * *